US006843137B2

(12) United States Patent  (10) Patent No.: US 6,843,137 B2
Keech  (45) Date of Patent: Jan. 18, 2005

(54) FLOWMETER FAULT DETECTION

(75) Inventor: Ray Keech, Stonehouse (GB)

(73) Assignee: ABB Limited, Stafforshire (GB)

( * ) Notice: Subject to any disclaimer, the term of this patent is extended or adjusted under 35 U.S.C. 154(b) by 412 days.

(21) Appl. No.: 10/059,277

(22) Filed: Jan. 31, 2002

(65) Prior Publication Data
US 2002/0117009 A1 Aug. 29, 2002

(30) Foreign Application Priority Data

Jan. 31, 2001 (GB) .............................................. 0102458

(51) Int. Cl.[7] .............................................. G01F 1/60
(52) U.S. Cl. .................................................. 73/861.17
(58) Field of Search .......................... 73/861.17, 861.6, 73/861.15

(56) References Cited

U.S. PATENT DOCUMENTS

| 4,676,112 A | 6/1987 | Uematsu et al. |
| 5,370,000 A | 12/1994 | Herwig et al. |
| 5,388,465 A | 2/1995 | Okaniwa et al. |
| 5,907,103 A | 5/1999 | Budmiger |
| 6,154,374 A | 11/2000 | Uejima et al. |
| 6,172,883 B1 | 1/2001 | Kates et al. |

FOREIGN PATENT DOCUMENTS

| EP | 0 939 483 A2 | 9/1999 |
| GB | 2 333 161 A | 7/1999 |

Primary Examiner—Edward Lefkowitz
Assistant Examiner—Jewel V. Thompson
(74) Attorney, Agent, or Firm—Stites & Harbison, PLLC; Ross F. Hunt, Jr.

(57) ABSTRACT

A previously unidentified problem of clipping in the input stages of flowmeter sensing circuitry has been identified and addressed. A solution is provided by flowmeter sensing circuitry, comprising:

first and second inputs for connection to potential sensing electrodes positioned to measure a potential difference across the fluid which potential is representative of flow;

differential amplifier means coupled to the first and second inputs for producing an output signal indicative of said potential difference across the fluid as a measure of flow; characterized by at least one voltage sensing means for sensing a voltage of at least one of the first and second inputs relative to a ground reference; and fault detecting means for detecting a potential fault if the voltage is outside a predetermined range.

28 Claims, 2 Drawing Sheets

FLOWMETER FAULT DETECTION

The present invention relates to flowmeters, in particular magnetic flowmeters.

Magnetic flowmeters are well known in the art and are widely used for measuring the flow of a fluid through a conduit, usually a pipe. The operating principle of magnetic flowmeters is well known and will not be described in detail here. Briefly, magnetic flowmeters have a magnet (permanent magnet or more usually electro magnet) for generating a magnetic field across the fluid, normally orientated perpendicularly to the direction of the flow. The field induces a potential in the fluid and two electrodes are positioned for sensing a voltage across the fluid. The sensing electrodes are generally situated such that a straight line through the sensing electrodes is perpendicular to the magnetic field and the flow of the fluid.

Whilst the basic principles of electromagnetic flowmeters have been known for some decades, present day flowmeters are relatively sophisticated and complex pieces of equipment, typically employing complex control circuitry and software to obtain accurate measurements using reduced power. Despite the complexity, such meters are nonetheless made robust and able to withstand a wide range of operating conditions.

The present invention stems from an investigation into the cause of located unreliable readings from a meter at a test site. By way of background, the investigation was concerned with a meter of a tested design which had proven to be very reliable and the cause of the problems was not readily identifiable. The meter was found, however, occasionally to give spurious readings, particularly at night.

As with most current complex electronics designs involving digital signal processing equipment, the "obvious" place to commence any investigation into such unusual behaviour would be in the software or the complex digital signal processing circuitry which is highly sensitive to external influences. Other probable causes may include fluid flow fluctuations or changes in fluid composition. Isolated problems are, by their very nature, difficult to trace and in a complex meter having complex software and sophisticated digital signal processing circuitry, there are a very large number of potential causes for an intermittent fault.

Investigations pursuant to the invention revealed that the test site was subject to appreciable earth currents flowing along the fluid conduit. Such currents are normally accounted for and meters are designed to be insensitive to such currents. The problems of earthing of the fluid have been appreciated and these problems can in principle be mitigated by ensuring that adequate earthing provision is made. Furthermore, earthing is normally provided to reduce such currents to prevent dangerous voltages existing on the conduit. The electronics of a meter are normally screened so that noise should not normally cause a problem. A differential amplifier is connected to the sensing electrodes to reject common-mode noise voltages.

However in addition to the known problems associated with inadequate earthing, investigations pursuant to the invention have revealed that certain intermittent problems which are not necessarily easy to detect, identify or attribute to a cause or to replicate may in fact be traced to spurious currents flowing through the fluid. Surprisingly, pursuant to the invention it has been appreciated that spurious earth currents can in certain cases cause the inputs of a differential amplifier of the meter to exceed the operating range of the amplifier.

By way of background, some form of fault detection has been provided in the prior art, but the problem of clipping of an input circuit has not been specifically identified or addressed. For example, U.S. Pat. No. 5,370,000 discloses a magnetic flowmeter in which the sensed voltages from the two measurement electrodes are passed to an impedance converter and on to an amplifier. Under normal conditions the outputs of the impedance converters have the same amplitude but are of opposite sign. If one of the electrodes is covered with an insulating layer, the output of the associated impedance converter will saturate, and this is interpreted as an "error", but the possibility of an imposed voltage causing clipping is not discussed.

U.S. Pat. No. 5,907,103 discloses a flowmeter which performs a "plausibility check" on the measurement results by comparing an analog difference signal from a differential amplifier receiving a buffered version of the sensed voltages and a difference measurement obtained by digitally subtracting the buffered signals from the measurement electrodes. The potential problem of clipping of the buffers or of the differential amplifier is not discussed or addressed.

According to a first aspect, the invention provides flowmeter sensing circuitry, comprising:

first and second inputs for connection to potential sensing electrodes positioned to measure a potential difference across the fluid which potential is representative of flow;

differential amplifier means coupled lo the first and second inputs for producing an output signal indicative of said potential difference across the fluid as a measure of flow; characterised by at least one voltage sensing means for sensing a voltage of at least one of the first and second inputs relative to a ground reference; and fault detecting means for detecting a potential fault if the voltage is outside a predetermined range.

In this way, a voltage which ordinarily has no significance can be monitored and a fault or potential fault identified and attributed to an excursion of this potential from a desired range. It will be appreciated that the terms "voltage" and "potential" may be used interchangeably to represent the same physical quantity; in this specification the terms may be varied to improve clarity but are intended to represent the same physical quantity.

Prior to the realisation pursuant to the invention, there was no suggestion that such an effect could result in the intermittent problems experienced nor was there any available indication that such voltages may be problematic. Furthermore, it has been appreciated pursuant to the invention that simply improving earthing may not necessarily cure the problem. Prior to the appreciation of the problem by the inventor, there was no means for monitoring the voltages in question as the voltages are not intrinsically meaningful and to measure them would add to the complexity. of metering apparatus.

The fault detecting means may comprise means for storing a log of samples of the voltage over a period of time. Although simply storing samples of the voltage will not necessarily enable detection of isolated transients between the sampling periods, surprisingly it has been found that simply measuring the value may nonetheless give an indication that the meter is operating in fault or near fault conditions. This is considered to be because large voltage excursions are, in practice, likely to last for some time and sampling of values at intervals even as crude as one minute, more preferably at least every ten seconds, most preferably at least every second, may give an indication that the meter is operating in an undesired regime.

The ground reference is preferably connected to a ground reference of the differential amplifier.

More preferably, the fault detection means includes maximum and/or minimum detection means for obtaining a measure of maximum and/or minimum voltage over a sampling interval. This allows isolated transients to be detected more reliably.

Most preferably, the apparatus includes means for storing the or each measure of voltage together with a measure of meter output so that meter output values can be correlated to the voltage and the absolute input voltage prevailing at the time of an output measurement can be investigated.

The apparatus may include means for signalling an alarm and/or means for modifying the output of the meter (for example switching to a default value, for example zero or for holding the previous value or a value based on preceding values) and/or means for activating protection means (for example switch means for switching a shunt or bypass device across the input terminals and the earth reference) to prevent damage to the electronics or to prevent spurious readings in the event of detection of a fault or potential fault condition.

The differential amplifier typically has a high input impedance (typically at least $10^{12}$ ohm, more typically of the order of $10^{15}$ ohm) and the voltage sensing means preferably has an input impedance at least of the same order of magnitude as the differential amplifier.

Thus, it will be seen that potential faults in a functional meter can be identified by use of the first aspect.

Once a fault is identified, the source can be traced with the assistance of the information provided by the fault detecting means. For example, the time of the fault may assist in identification of the source of the earth current. The very fact of identification of the fault may suggest corrective action, for example most simply the earthing system associated with the meter may be improved.

In a preferred embodiment the input terminals of the differential amplifying means (e.g. a differential amplifier) are connected to the first and second inputs of the sensing circuitry without there being any further (pre)amplifying means connected between the sensing circuitry inputs and the differential amplifying means. This may improve the reliability of the sensing circuitry.

The predetermined range is preferably selected based on an operational characteristic of the differential amplifier means, and is most preferably selected based on a voltage with respect to ground at which clipping or distortion is liable to occur in the differential amplifier means. The predetermined range may be selected to be slightly smaller (e.g. 5% smaller) than the voltage with respect to ground at which clipping or distortion is liable to occur in the differential amplifier means.

In a related aspect, the present invention provides apparatus which may be used for detecting potential problems prior to installation of a meter. Specifically, in a second apparatus aspect, the invention provides apparatus for monitoring fluid potential at a location where a flowmeter is to be installed, the apparatus comprising at least one input for connection to a potential sensing electrode positioned to contact the fluid;

voltage sensing means for obtaining a measure of the voltage between the potential sensing electrode and a ground reference; and monitoring means for monitoring said voltage over a period of time to detect a voltage outside a predetermined range.

Preferably, the monitoring means is operable over a period of at least 24 hours and more preferably operable over several days, preferably at least about a week; this facilitates detection of isolated voltage excursions which may only occur, for example at night or on particular days of the week.

The invention further provides, in a third aspect, an analysis tool for detecting a potential fault in a flowmeter installation comprising means for receiving an input of the voltage of at least one potential sensing electrode of the flowmeter with respect to ground over a period of time and means for identifying from said input excursions of said voltage outside a predetermined range.

Either the second or the third aspect may include a chart recorder providing an analog visible output of the potential. More preferably, however, the potential is stored as a series of samples in digital form to facilitate processing or downstream analysis.

In a first method aspect, the invention provides a method of detecting a potential fault in flowmeter sensing circuitry comprising first and second inputs for connection to potential sensing electrodes positioned to measure a potential difference across the fluid which potential is representative of flow and differential amplifier means coupled to the first and second inputs for producing an output signal indicative of said potential difference across the fluid as a measure of flow, the method comprising:

sensing a voltage of at least one of the first and second inputs relative to a ground reference; and detecting a potential fault by detecting whether the voltage is outside a predetermined range.

The invention further provides use of a measure of voltage with respect to a ground reference voltage of an input of a differential amplifier of flowmeter sensing circuitry to detect a potential fault condition.

An embodiment of the invention will now be described, by way of example, with reference to the accompanying drawings in which.

Figure 1:
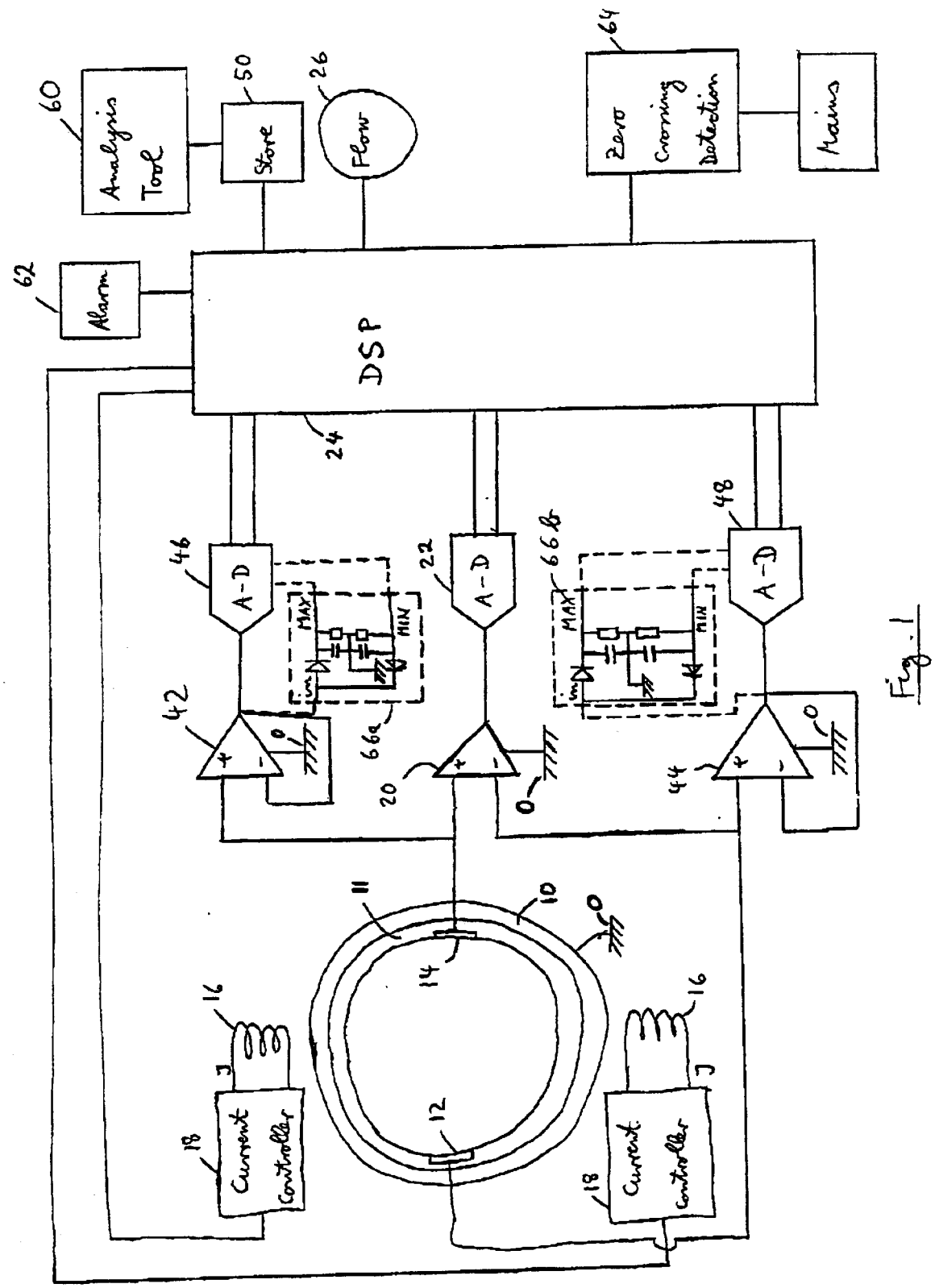
FIG. 1 illustrates schematically a typical electromagnetic flowmeter arrangement modified to include fault protection circuitry in accordance with an embodiment of the invention.

Referring to FIG. 1, a flowmeter comprises a conduit 10 having an insulating lining 11 inside which is provided a pair of potential sensing electrodes 12, 14 connected to respective inputs of a differential amplifier 20 the output of which is provided to an analog-to-digital converter 22 coupled to digital signal processing circuitry 24 which provides an output 26 signalling flow. Digital signal processing circuitry 24 also controls the current I applied to opposed field generating coils 16 (shown schematically) by means of current controller 18; in practice this will normally include an electronic current controller capable of changing polarity as well as magnitude of current. Both the conduit 10 and the differential amplifier 20 are connected to earth 0.

The arrangement discussed above is conventional and generally works well. It is relatively insensitive to the absolute voltage between the electrodes 12, 14 and the earth 0 so that noise voltages are generally ignored.

In accordance with this embodiment, additional amplifiers 42, 44 are coupled to the respective inputs of the differential amplifier and the outputs of these are digitized by means of analog digital converters 46, 48 and supplied to a store 50 under the control of the digital signal processing circuitry 24, together with the outputs of the first analog-to-digital converter 22.

These amplifiers should ideally have a higher input voltage range than the differential amplifier 20. For example, if the differential amplifier works reliably at input voltages in the range ±2V, it is preferable that the amplifiers 42, 44 and ADCs 46, 48 can reliably record voltages at least 10% greater. It is an independent preferable feature, not limited to this embodiment, that monitoring means having a wider input voltage range than the useful (by which is preferably meant substantially clipping free or linear or within a defined accuracy tolerance) input range of the differential amplifier is provided. It will be appreciated that relatively low resolution and low speed (i.e. inexpensive) analogue-to-digital converters may be employed to monitor input voltage as precise measurements are not required. Another preferred feature is the use of a lower resolution or lower speed but higher voltage range ADC for monitoring of the input voltage. Of course, if a multi-channel ADC is provided, a "spare" channel may be used for monitoring.

The store may typically contain, for example, 128 k bytes of Flash memory. This allows approximately 24 hours worth of data to be stored at intervals of 10 seconds for each of the two absolute potentials and the output of the meter. It will be readily appreciated that the length of time for which data can be stored and the sampling intervals can readily be increased by increasing the amount of memory available. For example, a conventional 8 Mbyte Flash memory enables data to be stored at 1 second intervals over a period of one week for all three channels. As an alternative, the store may be configured to store statistical properties, such as measures of mean and/or peak voltages and optionally a measure of standard deviation, over defined intervals or cumulatively; this may greatly reduce the amount of storage required.

Other optional components shown in FIG. 1 will be discussed.

The contents of the memory may optionally be supplied, off-line or on-line, to an analysis tool 60, which may be implemented as a computer program on a PC and may be provided independently.

An alarm 62 may be provided and triggered by the DSP 24 in response to an unacceptable potential.

A zero crossing detector 64 connected to the local mains supply may be used to provide trigger signals to enable sampling at a defined phase with respect to the mains.

Peak detectors 66a and 66b (shown schematically in dashed lines) providing maximum and minimum outputs may be provided. This would require two input channels for each ADC (or a switch). Examples of suitable peak detection circuitry are well known, one being shown in FIG. 1. For example, a simple peak detector can be implemented using a diode coupled in series with a capacitor with a resistor in parallel with the capacitor, the RC combination having a time constant of the order of the sampling interval. Alternatively, a peak detector may be implemented in software, for example by initially sampling at relatively small intervals, preferably small compared to a mains period (e.g. of the order of 1 ms) and then storing the maximum and minimum values measured over a larger sampling interval (e.g. of the order of 1–2 seconds).

Figure 2:
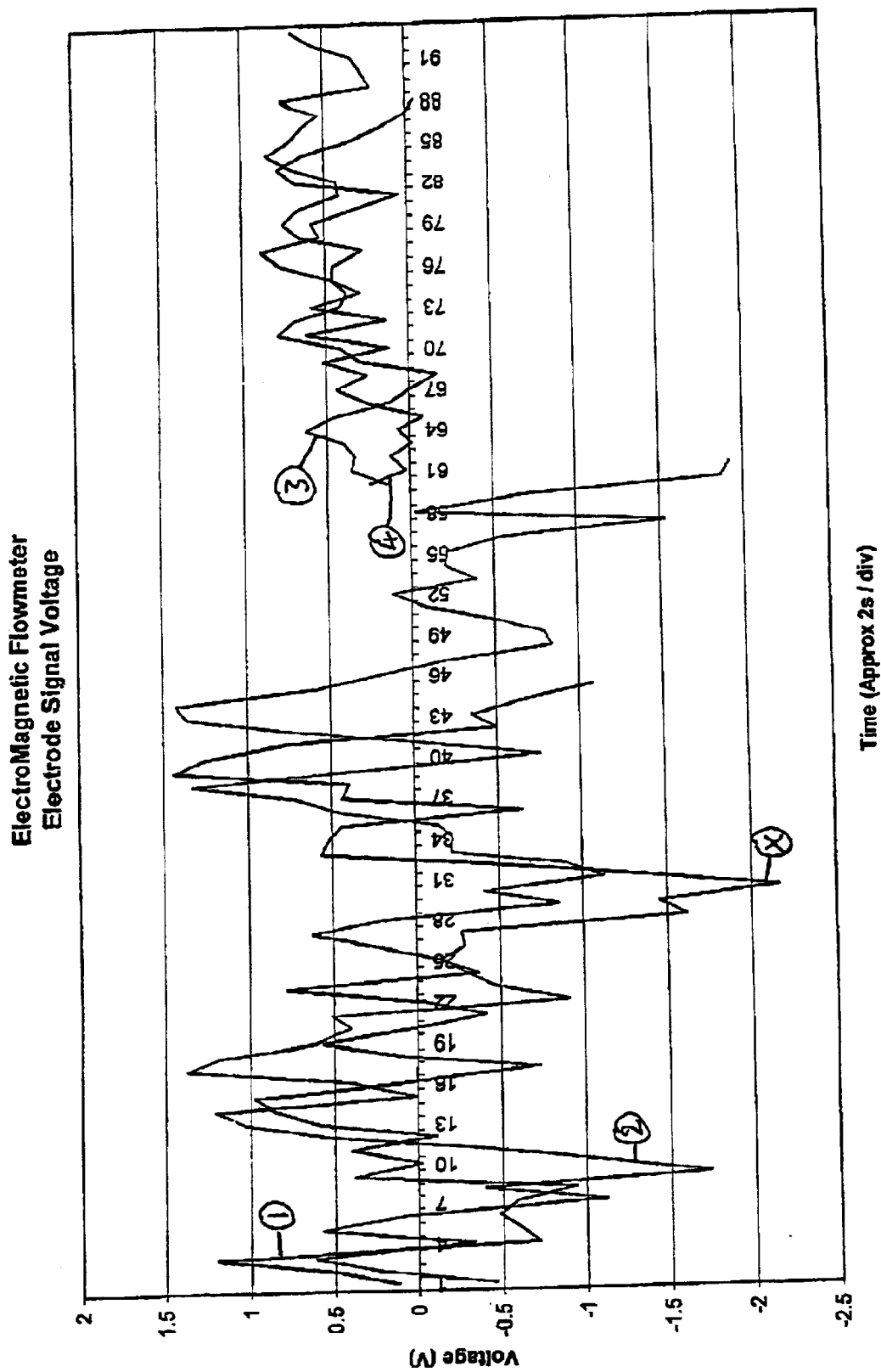
FIG. 2 is a graph of voltage sensed in a test meter installation.

Typical results for an actual test installation are depicted in FIG. 2. In the figure, graphs 1 and 2 represent the randomly sampled input voltages for the electrodes 12, 14 respectively at about 7.30 pm and graphs 3 and 4 represent the voltages sampled at about 11.30 am the following day. The samples were taken at approximately 2 second intervals so the time span for the first set of samples was about 2 minutes and the time span for the second set was about 1 minute. It can readily be seen that significant voltage excursions were present and at point X the voltage on electrode 12 was outside the +/−2V input range of the differential amplifier.

The results shown in FIG. 2 appear to show relatively random fluctuations. This is because the sampling was carried out at essentially arbitrary times, that is without synchronisation to the mains frequency or to the excitation applied to the flowmeter coil. Such sampling has the benefit of being very simple to implement and also provides the advantage that both random and systematic excursions are likely to be identified eventually. A potential drawback, on the other hand, is that peak values will not be reliably captured and trends are less easy to spot. To overcome this drawback, it is possible, as mentioned, to measure peak (maximum and minimum) values over an interval, using a conventional peak detector. It is also possible to synchronise the measurement with the coil excitation (both are controlled by the processing circuitry 24).

Advantageously, since most of the noise is likely to be related to local mains voltages, it is desirable to synchronise the sampling with the local mains frequency. For example sampling at a series of intervals which are a whole multiple of mains periods will measure voltages at the same phase in the mains cycle. By adding a further offset which is a fraction of a mains period, either between samples or between sets of samples, the phase can be varied and it may be possible to identify excursions at a particular phase with respect to the mains. For example, sampling may be carried out at a plurality of phase offsets (e.g. every 30 degrees or so). There are a number of ways in which synchronised sampling can be performed. For example, circuitry for generating a trigger signal at a fixed or variable offset with respect to a mains zero-crossing is well known and such circuitry can be used to trigger sample capture. This has the benefit that variations in local mains frequency will still allow sampling at a well defined phase over longer sample intervals. If the phase at which particular disturbances is accurately measured, this may assist in tracing the cause of the disturbance. Alternatively, sample intervals could simply be set accurately based on a set period. For example, with 50 Hz mains, a mains cycle is 20 ms (16 ms for 60 Hz) so if samples were taken every 1.001 seconds, the phase would scan gradually by about 20 degrees each sample, although this would be less reliable if the mains frequency varied. Sampling at a phase which can be varied in a controlled manner is a preferred feature which may be provided independently.

It will readily be appreciated that a simple monitoring device can be constructed by omitting certain components for example the field generating coils 16, current controller 18 and the output circuitry 26.

It will be appreciated that modifications of the apparatus described may be employed and that the preferred and optional features may be provided independently, unless otherwise stated.

What is claimed is:

1. Flowmeter sensing circuitry, comprising:
   first and second inputs for connection to potential sensing electrodes positioned to measure a potential difference across the fluid which potential is representative of flow;
   differential amplifier means coupled to the first and second inputs for producing an output signal indicative of said potential difference across the fluid as a measure of flow; characterised by
   at least one voltage sensing means for sensing a voltage of at least one of the first and second inputs relative to a ground reference; and
   fault detecting means for detecting a potential fault if the voltage is outside a predetermined range.

2. Flowmeter sensing circuitry according to claim 1, wherein the fault detecting means comprises means for storing a log of samples of the voltage over a period of time.

3. Flowmeter sensing circuitry according to claim 1, wherein the voltage sensing means and the fault detecting means are arranged to store samples at sampling intervals of one minute or less.

4. Flowmeter sensing circuitry according to claim 1, wherein the ground reference is connected to a ground reference of the differential amplifier.

5. Flowmeter sensing circuitry according to claim 1, wherein the fault detection means includes maximum and/or minimum detection means for obtaining a measure of maximum and/or minimum voltage over a sampling interval.

6. Flowmeter sensing circuitry according to claim 1, further including means for storing the or each measure of voltage together with a measure of meter output.

7. Flowmeter sensing circuitry according to claim 1, further including means for signalling an alarm in the event of detection of a fault or potential fault condition.

8. Flowmeter sensing circuitry according to claim 1, further including means for modifying the output of the meter in the event of detection of a fault or potential fault condition.

9. Flowmeter sensing circuitry according to claim 8, wherein the modifying means comprises means for switching to a default value, preferably zero.

10. Flowmeter sensing circuitry according to claim 8, wherein the modifying means comprises means for maintaining the output at a value based on the output value preceding detection of the fault.

11. Flowmeter sensing circuitry according to claim 1 including means for storing a measure of statistical information derived from samples.

12. Flowmeter sensing circuitry according to claim 1 including means for obtaining measurements of electrode voltage related to the phase of the local mains voltage.

13. Flowmeter sensing circuitry according to claim 1, wherein the differential amplifier has a high input impedance, preferably of the order of at least $10^{12}$ ohm.

14. Flowmeter sensing circuitry according to claim 1, wherein the voltage sensing means has an input impedance of at least the same order of magnitude as the differential amplifier.

15. Flowmeter sensing circuitry according to claim 1, wherein the predetermined range is selected based on an operational characteristic of the differential amplifier means.

16. Flowmeter sensing circuitry according to claim 1, wherein the predetermined range is selected based on a voltage with respect to ground at which clipping or distortion is liable to occur in the differential amplifier means.

17. A method of detecting a potential fault in flowmeter sensing circuitry comprising first and second inputs for connection to potential sensing electrodes positioned to measure a potential difference across the fluid which potential is representative of flow and differential amplifier means coupled to the first and second inputs for producing an output signal indicative of said potential difference across the fluid as a measure of flow, the method comprising:

sensing a voltage of at least one of the first and second inputs relative to a ground reference; and detecting a potential fault by detecting whether the voltage is outside a predetermined range.

18. A method according to claim 17, further comprising storing a log of samples of the voltage over a period of time.

19. A method according to claim 17, further comprising sampling the voltage at least once per sampling interval of one minute.

20. A method according to claim 17, including obtaining a measure of maximum and/or minimum voltage over a sampling interval.

21. A method according to claim 17, further including storing the or each measure of voltage together with a measure of meter output.

22. A method according to claim 17, further including signalling an alarm in the event of detection of a fault or potential fault condition.

23. A method according to claim 17, further including modifying the output of the meter in the event of detection of a fault or potential fault condition.

24. A method according to claim 23, wherein modifying comprises switching to a default value, preferably zero.

25. A method according to claim 23, wherein modifying comprises maintaining the output at a value based on the output value preceding detection of the fault.

26. A method according to claim 17, further including adjusting the phase at which measures of voltage are obtained relative to local mains voltage.

27. A method according to claim 17, wherein the predetermined range is selected based on an operational characteristic of the differential amplifier means.

28. A method according to claim 17, wherein the predetermined range is selected based on a voltage with respect to ground at which clipping or distortion is liable to occur in the differential amplifier means.

* * * * *